Nov. 24, 1936.  B. G. CARLSON  2,061,894
CONSTRAINED DIRECTIONAL GYROSCOPE
Filed April 29, 1932  3 Sheets-Sheet 1
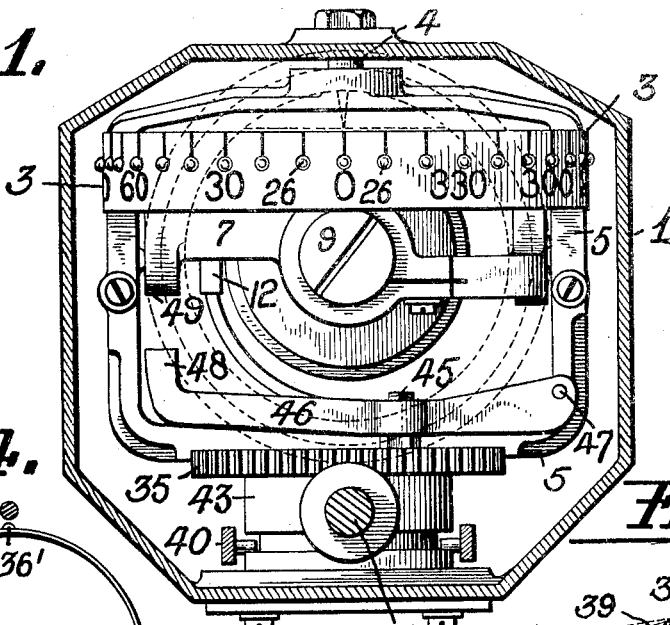
Fig.1.
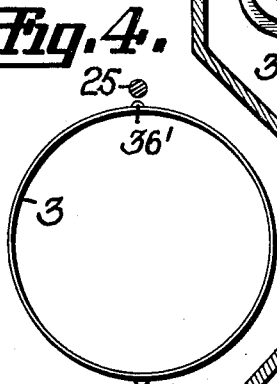
Fig.4.
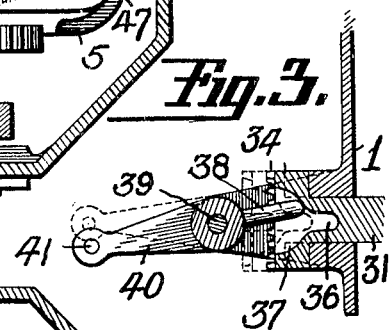
Fig.3.
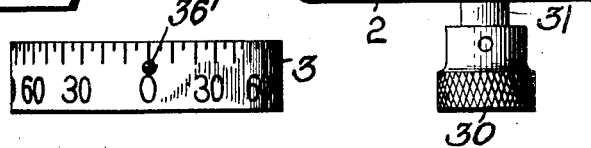
Fig.2.
Fig.5.
INVENTOR
BERT G. CARLSON.
BY
Herbert H. Thompson
his ATTORNEY.

Nov. 24, 1936.  B. G. CARLSON  2,061,894
CONSTRAINED DIRECTIONAL GYROSCOPE
Filed April 29, 1932   3 Sheets-Sheet 2
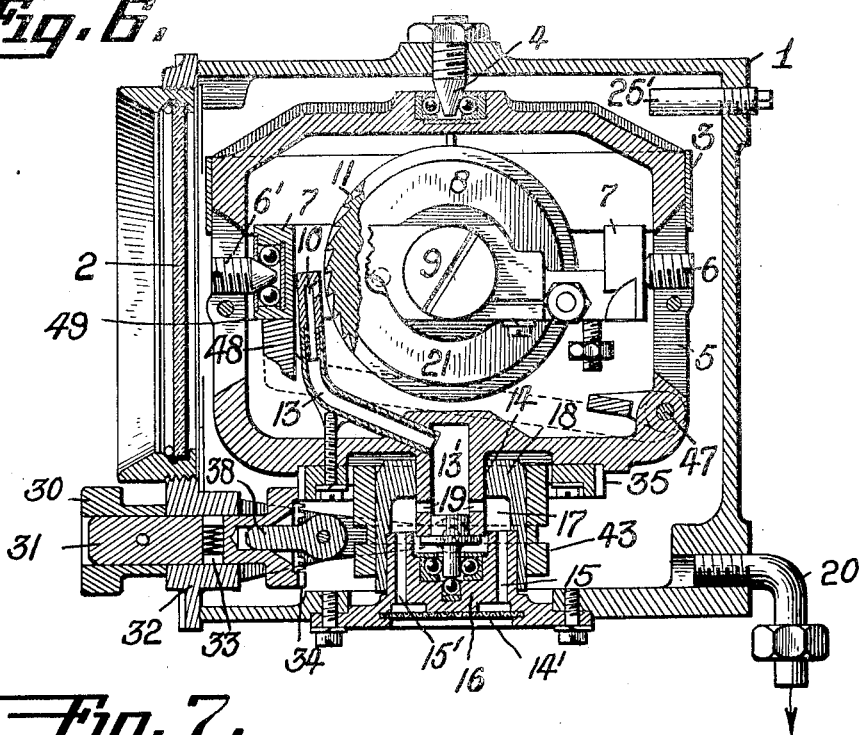
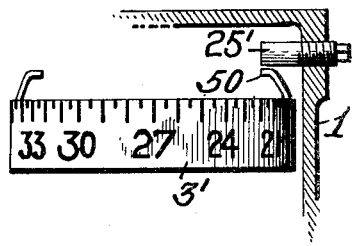
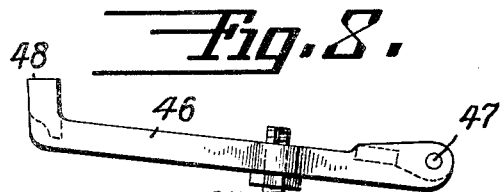
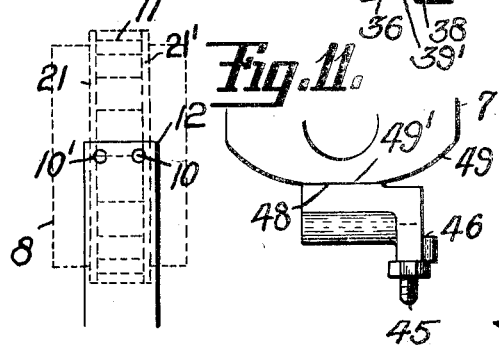
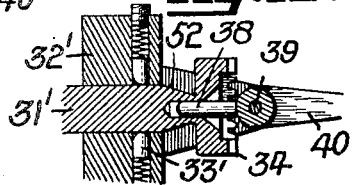
INVENTOR
BERT G. CARLSON.
BY
Herbert H. Thompson
his ATTORNEY.

Nov. 24, 1936.  B. G. CARLSON  2,061,894
CONSTRAINED DIRECTIONAL GYROSCOPE
Filed April 29, 1932  3 Sheets-Sheet 3

INVENTOR
BERT G. CARLSON.
BY
Herbert H. Thompson
ATTORNEY.

Patented Nov. 24, 1936

2,061,894

UNITED STATES PATENT OFFICE 2,061,894

CONSTRAINED DIRECTIONAL GYROSCOPE

Bert G. Carlson, Queens Village, N. Y., assignor to Sperry Gyroscope Company, Inc., Brooklyn, N. Y., a corporation of New York Application April 29, 1932, Serial No. 608,189

6 Claims. (Cl. 33—204)

This invention relates to directional gyroscopes especially adapted for aircraft or other dirigible vehicles of limited weight-carrying capacity. Such gyroscopes usually have three degrees of freedom employing a vertical ring mounted for rotation about a vertical axis in a fixed support, a rotor bearing ring or casing journalled for oscillation about a horizontal axis in said ring, and a rotor mounted on a normally horizontal spinning axis in said last-named ring at right angles to the first named horizontal axis, but other mountings are sometimes employed and my invention is not limited to any particular type of mounting. Such gyroscopes, however, having no meridian seeking power, as do gyroscopic compasses, have a tendency to wander in azimuth and also to become inclined about the horizontal axis, and it is one of the objects of the present invention to correct both of these tendencies in a simple direct manner.

For preventing a gyroscope from acquiring objectionable tilt around its horizontal axis, I prefer to employ the means outlined in my prior application, now Patent 1,982,637, dated December 4, 1934, for Directional gyroscopes, in which the driving jet or jets are employed to exert a corrective torque about the vertical axis of the gyroscope upon inclination about its horizontal axis to directly reduce the tilt. In other words, upon deviation of the gyroscope from its correct position about its horizontal axis, I apply a torque about an axis at right angles thereto, i. e., the vertical axis. For correcting wandering about the vertical axis, however, I prefer to apply, through yielding means, a torque about the same axis. When I employ such a torque in combination with my novel means for preventing tilting about the horizontal axis, I have found experimentally that the gyroscope is prevented from wandering about its vertical axis without causing appreciable tilt thereof in spite of the fact that the direct result of such a torque about the vertical axis is to cause tilt and that said tilt brings into action an opposing torque about the vertical axis. By the coaction of these two means any tendency of the gyroscope to slowly wander is corrected without disturbing the gyroscope or causing it to follow temporary deviations of the aircraft.

A further object of the invention is to improve the manual resetting means used in such gyroscopes.

Referring to the drawings showing several forms of my invention,

Fig. 1 is a front elevation of my directional gyroscope, the casing or housing of the same being shown in section.

Fig. 2 is a top plain view of the same with the casing likewise being in section.

Fig. 3 is a detail of the resetting means for the gyroscope.

Fig. 4 shows a plan view of a modified form of centralizing or wander preventing means as applied to the indicating card.

Fig. 5 is a front view of the same.

Fig. 6 is a vertical section of another form of my directional gyro, the gyroscope being in the same position as shown in Fig. 1 but the case being at right angles thereto.

Fig. 7 is a detail showing a side view of the card and magnet employed in Fig. 6.

Fig. 8 is a further detail of the locking or centralizing means.

Fig. 9 is a side elevation of the rotor driving jets.

Fig. 10 is a sectional detail of a modified form of resetting means.

Fig. 11 is a detail of the lock about the horizontal axis in front elevation.

Figure 12:
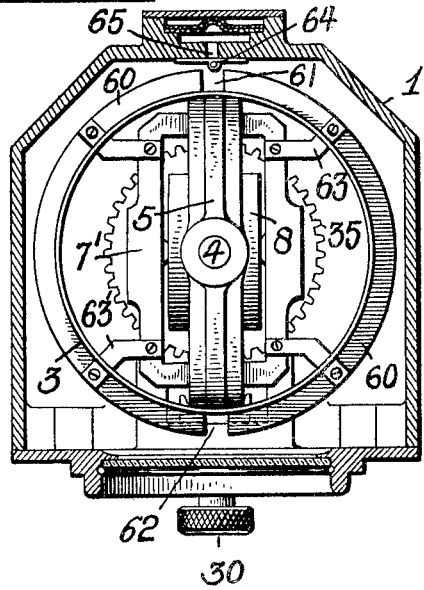
Fig. 12 shows a modified form of my invention, being a horizontal section through the gyro casing with the gyroscope shown in plan.

As above stated, my invention is shown as applied to a conventional directional gyroscope comprising an outer casing or housing 1 for supporting and enclosing the same, said housing being provided with a front window 2 through which the indicator or compass card 3 on the gyroscope may be read. Within said casing there is journalled on vertical bearings 4, 14 a vertical ring 5, and within said ring there is supported on horizontal trunnions 6, 6' a rotor bearing frame or ring 7. The rotor 8 is shown as journalled for rotation within said ring on normally horizontal rotor bearings 9. The rotor is preferably driven by an air jet or jets 10, 10', the streams of air, therefore, striking buckets 11 cut in the periphery of the rotor. The jets are preferably provided by holes drilled obliquely in one side of flattened end 12 of a tube 13 supported on the vertical ring and receiving air from a passage 13' in the lower bearing 14 of the vertical ring. Air is supplied to said passage from the outside through a screened opening 14' in the casing, the air passing through channels 15, 15' in the bearing block 16, thence into annular channel 17 in the bearing housing member 18 and thence through radial passages 19 into the chamber 13'. The particular form of gyroscope illustrated, therefore, works on negative pressure, air being continuously withdrawn from the casing through pipe 20 by means not shown. As described in my aforesaid Patent 1,982,637, the air jets 10 and 10' act to prevent tilting of the gyroscope about axis 6, 6' by the fact that one or the other of said jets impinges against the inner side of the annular walls 21 and 21' around the buckets when the rotor becomes inclined, thus exerting a corrective torque upon the gyroscope about its vertical axis to cause precession about the horizontal axis which reduces the tilt directly.

Such gyroscopes are usually provided with a setting means whereby they may be set on any desired course or corrected from time to time by the magnetic compass. My improved setting means is shown as a thumb piece 30 fixed to a short shaft 31 slidably and rotatably mounted in gland 32. Said shaft is provided with slip friction, spring-pressed blocks 33 so that it may be yieldingly held either in its inner or outer positions. At its inner end said shaft is provided with a crowned gear 34 which, when said shaft is pushed inwardly as far as it will go, meshes with an annular spur gear 35 secured to the base of the vertical ring 5 whereby the gyroscope may be set by turning the knob 30. Means are also provided to lock or centralize the gyroscope about its horizontal axis at this time to prevent precession. Preferably such means should operate before gears 34 and 35 are brought into mesh and be released after said gears are released to avoid damage to the gears and disturbance of the gyroscope. To this end shaft 31 has its inner end provided with a bore 36 having a flaring mouth 37. When pushed inwardly, the walls of said mouth engage a finger 38 secured to shaft 39 which is journalled in bracket 39', thus centralizing the finger upon initial movement of shaft 31, the further inward movement merely causing said finger to enter bore 36. Also secured to said shaft 39 is a fork 40 (Fig. 3), the outer ends of which are provided with pins 41 to engage an annular groove 42 in an outer sleeve 43, slidably mounted on the bearing housing. Normally said sleeve rests in its lowermost position but when shaft 31 is first pushed inwardly, the pin 38 rotates the shaft 39 to raise the forked lever 40, thus raising sleeve 43 to the position shown in Figs. 6 and 8. On the top of sleeve 43 rests an adjustable set screw 45 threaded in a locking lever 46 pivoted at 47. The outer end of said lever is turned inwardly and upwardly and flattened to form a seat 48 which engages the under side of the ring 7 underneath pivot 6' as shown in dotted lines in Fig. 6, said bearing being provided with a rounded under surface 49 with a flat middle portion 49' for this purpose. Thus means are provided to lock the gyroscope about its horizontal axis when it is desired to adjust the same about its vertical axis. Obviously it will remain locked until after the gears 34 and 35 are out of mesh, i. e., until the finger is out of hole 36.

For preventing deviation in azimuth, I provide yielding centralizing means acting between a fixed part of the airplane, such as the casing 1, and the gyroscope to exert a weak, yielding torque thereon upon continued deviation of the gyroscope from its fixed position in the casing. In order that the gyroscope may function as a direction indicator, it is, of course, essential that it remain unaffected by temporary turning of the plane first in one direction, then the other, so that the gyroscope may indicate the desired straight course to the aviator. In case the gyroscope is wandering in one direction, however, there is set up a yielding torque to return it very slowly to its original position. To such end I provide a magnetic means acting between the casing and the gyroscope upon deviation thereof about the vertical axis.

As shown in Figs. 1 and 2, a permanent magnet 25 is placed in the rear of the case adjacent the indicating card 3 and on said card is provided, at spaced intervals, knobs or balls 26 of soft iron or other magnetizable material. Said balls are uniformly spaced, say every 10°, around the periphery.

Instead of providing a plurality of magnetic means around the periphery of the card, I may provide only one or two such means as indicated in Figs. 4, 5, 6, and 7. As shown in Figs. 4 and 5, soft iron buttons 36' are placed on the zero and 180° points on the card, the gyroscope being normally set on zero, the 180° point being used in case the pilot desires to turn around and come back to his original starting point. In this case also the card is preferably graduated in the same manner on both sides of the zero (Fig. 5), the device being used as a means for maintaining a fixed course and indicating deviation therefrom rather than as a compass.

In Figs. 6 and 7 is shown a slightly different form of magnetic means. In this case the magnet 25' is screwed in from the side of the gyro casing some distance above the indicator card 3' and the card is provided with one or more upstanding iron wires 50, one of which lies directly under the magnet when in the proper position.

A modified form of caging or setting device is shown in Fig. 10. In this form the spring-pressed friction blocks 33' are placed in the bearing or gland 32' instead of within the stem 31' and the stem is beveled off near its inner end as at 52 so that when the stem and thumb piece are pulled out far enough to disengage the gears, the spring-pressed plungers 33' will push the stem into its outward position, thus freeing the gyroscope and requiring a positive strong inward push to cage the gyroscope to bring the crowned gear 34 into engagement with the spur gear 35 on the vertical ring.

The operation and manner of use of my invention is somewhat similar to the ordinary directional gyroscope but in using my invention the aviator should set the gyroscope so that one of the buttons 26 lies under the course he is flying on. Usually the zero button is chosen for this purpose and the gyroscope set so that it reads zero when he is on his desired course. At this time the button on the 180° mark will lie directly under or opposite the magnet 25 or 25'. In the form shown in Figs. 1 and 2, a course change in 10° increments could be effected without resetting the gyroscope, but for intermediate courses, or in the form shown in Figs. 6 and 7, the gyroscope should be reset after the course change is made unless the change is 180°. The gyroscope, however, may and should be used during the change since the weak magnetic torque will exert no appreciable disturbing effect on the gyroscope at that time. This is true not only because the force is weak but also because the magnetic attraction ceases as soon as the button is more than a fraction of an inch away from the magnet. Deviation due to the magnet is also negligible because this force does not produce any direct turning about the vertical axis but only a very slow movement in the direction of the applied force due to the resistance offered against precession by my novel air jet arrangement.

Figure 13:
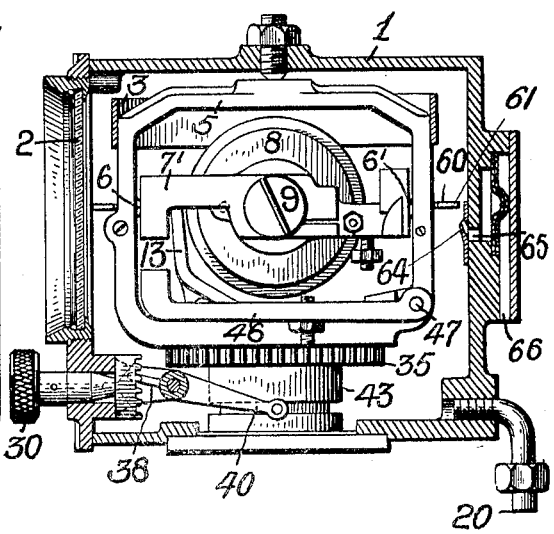
Fig. 13 is a vertical section through the casing of the same, showing the gyroscope in side elevation.

A somewhat different form of the invention is shown in Figs. 12 and 13. According to this form, the air jet torque about the vertical axis upon inclination of the rotor about the horizontal axis is retained, but a somewhat different yielding means is employed to prevent the gyroscope from wandering in azimuth. According to this form of the invention, the gyroscope is left perfectly free as long as it remains within a few degrees of a predetermined position in azimuth with respect to its housing. In other words, a limited deviation is permitted without applying any torque on the gyroscope, thus avoiding disturbing the gyro by the yawing of the aircraft. When, however, the deviation exceeds a predetermined amount, a torque is applied (in this instance about the horizontal axis of the gyroscope to cause precession about the vertical axis) to return the gyroscope to near its original position with respect to the housing or aircraft.

As shown, the rotor bearing frame or casing 7' has secured thereto an annular ring 60 which is preferably cut away at the rear to form an opening 61 and which may also be cut away at the front to form an opening 62, both openings being of appreciable width, on the order of 5 or 10 degrees. Each half of the ring is shown as secured by a pair of brackets 63, 63' to the frame 7'. At the rear of the case and in the same vertical plane as pivot 6' of ring 7' there is shown an upwardly directed nozzle or air jet 64 connected to the atmosphere through passages 65 and 66. As the air is withdrawn from the case through the pipe 20, jets of air will not only be discharged against the rotor through pipe 13 as in the other forms of the invention but there will also be a jet of air discharged upwardly from the nozzle 64. When the gyroscope is in the position shown in Fig. 12, no reaction will be exerted thereon by this jet nor will any force be exerted unless the gyroscope wanders from this position more than the width of the slot 61. When, however, the gyroscope turns either right or left through more than this angle a torque will be exerted about the horizontal axis 6, 6' of the rotor bearing frame to cause the gyroscope to precess back to its original position. It should be noted that such torque may be made small and does not increase regardless of whether the departure of the gyroscope is large or small. This torque is also always applied even though the departure may be through a large angle. This, of course, would not be true in the form of the invention shown in Figs. 4 to 7, since in these forms if the button 36' or the wire 50 gets very far away from the magnet 25 or 25' there is no appreciable force exerted on the gyroscope.

It will be understood that the erecting or tilt preventing device, which comprises the spinning jets themselves as shown in Figs. 6 and 9, is retained in this form also.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyroscopic apparatus, a fixed support, a ring rotatably mounted about an axis in said support, a rotor bearing frame mounted in said ring for turning about a second axis, means on said ring for engaging and centralizing said frame about said second axis, and means on said support for operating said centralizing means regardless of the position of the said ring and for resetting said ring comprising a slidably and rotatably mounted thumbpiece, a crown gear at its inner end for rotating said ring, the face of said gear having a tapering bore, a sleeve slidably mounted adjacent the axis of said ring, and a forked lever pivoted adjacent thereto and having an extension adapted to be rotated by said bore when said thumb piece is pushed inwardly to raise said sleeve and said centralizing means.

2. In a directional gyroscopic apparatus, a fixed support, a vertical ring rotatably mounted about a vertical axis in said support, a rotor bearing frame mounted in said ring for oscillation about a horizontal axis, a spur gear on said vertical ring, a slidably mounted crown gear adapted to be brought into mesh with said first mentioned gear to reset the gyroscope, means for sliding said gears into and out of mesh and rotating the same, a caging device for locking the frame about its horizontal axis, and means for operating said device from said gear sliding means, said operating means including a beveled socket in the face of said crown gear and a pivoted stud adapted to engage the same as said gear is pushed inwardly, thereby bringing said cage into operation before and releasing it after said gears engage.

3. In a neutrally mounted directional gyroscopic apparatus, a fixed support, a vertical ring rotatably mounted about a vertical axis in said support, a rotor bearing frame mounted in said ring for oscillation about a horizontal axis, air jet means brought into action by tilting of said frame for applying a torque about said vertical axis to reduce the tilt, and air jet means brought into action by wandering of the vertical ring from a predetermined position in azimuth relatively to said fixed support for applying a torque about the horizontal axis of said frame.

4. In a gyroscopic apparatus, a fixed support, a ring rotatably mounted about an axis in said support, a rotor bearing frame mounted in said ring for oscillation about a second axis normal to the first axis, a gear on said ring, a slidably mounted gear adapted to be brought into mesh with said first mentioned gear to reset the gyroscope about said first axis, means for sliding said gears into and out of mesh and rotating the same, and a caging device for locking the frame about its second axis, comprising a pivoted lock adapted to engage said frame when raised, a slidable sleeve on which said lock rests, a pivoted latch for raising said sleeve, and a stud on said latch, said slidable gear having a flaring mouth and socket which engages said stud to rotate said latch to raise said sleeve as said gear is pushed inwardly prior to the time it engages said second gear.

5. In a directional gyroscope, the combination with the rotor and rotor bearing frame, a vertical ring in which said frame is mounted for oscillation about a horizontal axis and a support in which said ring is rotatably mounted for movement about a vertical axis, of a split ring secured to said frame to lie in a horizontal plane, and an air jet on said support normally discharging a stream through the split in the ring but engaging said ring to exert a torque on said frame upon deviation of said vertical ring from a predetermined position in the support.

6. In a resetting device for directional gyroscopes, the combination with a directional gyroscope and an outer casing therefor, of a compass card for the gyroscope, means for rotatably mounting the same about a vertical axis, a gear connected thereto for resetting the same, a resetting knob slidably and rotatably mounted in said casing, a normally disengaged gear thereon adapted to engage in one position said other gear, and a pin and tapered hole separable connection between said knob and card mounting means, to prevent disturbance of the gyroscope during resetting, said pin and hole engaging before and releasing after said gears.

BERT G. CARLSON.